Patented Dec. 7, 1948

2,455,713

UNITED STATES PATENT OFFICE 2,455,713

PREPARATION OF A SULFIDE CATALYST

Alexis Voorhies, Jr., Baton Rouge, La., assignor to Standard Oil Development Company, a corporation of Delaware No Drawing. Original application November 3, 1943, Serial No. 508,865. Divided and this application December 4, 1945, Serial No. 632,803

2 Claims. (Cl. 252—248)

The present application is a division of my application Serial Number 508,865, filed November 3, 1943 (now abandoned).

The present invention relates to improvements in the production of aromatic amines and more particularly it relates to the production of xylidines.

Recently, it has been discovered that aviation gasoline can be improved by adding thereto from one-half to two volume per cent of aromatic amines such as the xylidines. Commercial methods for producing xylidines on a relatively large scale have therefore become important.

Due to the fact that the conversion of nitroxylenes to xylidines is a highly exothermic reaction, it is necessary to control temperatures in the reaction zone carefully to prevent rapid increases in temperature with degradation of the amino product and even reactions of explosive violence. It is desirable, therefore, to produce xylidines by hydrogenation of nitroxylenes at as low temperatures as possible. This desideratum requires an active catalyst to give reasonably rapid rates of reaction and good yields at low temperatures.

I have found that sulfides of the sixth group of the periodic system mixed with sulfides of metals of the Fe group are very effective catalysts for the reduction of aromatic nitro compounds. Thus, mixtures of tungsten or molybdenum sulfide with nickel sulfide constitute a particularly effective combination. In general, the ratio of the sixth group sulfide to the Fe group sulfide may be about one-half to two parts by weight of the sixth group metal sulfide per part of the Fe group sulfide. While these mixed sulfides may be used alone, they are preferably supported on a suitable carrier or spacing agent such as alumina (in its various forms), clay, silica gel, charcoal and the like. Another modification of my invention involves the use of molybdenum sulfide alone as the active catalyst on a suitable support, such as the alumina or other support previously referred to. A third modification of my invention involves as the active catalyst a mixture of sixth group metal sulfides such as molybdenum sulfide and tungsten sulfide. Another important aspect of my invention involves the heat treatment of the impregnated carrier or support, admixed with clay, for the purpose of increasing its mechanical strength.

The main object of my invention is to provide a continuous process adapted to convert nitroaromatics at relatively low temperatures but at reasonable rates of reaction and in good yields to the corresponding amines.

Another object of my invention is to devise a continuous process and suitable catalysts therefor which will enable the production of aromatic amines on a large commercial scale at a lower cost.

A more limited object of my invention is to provide a process adapted to convert continuously and in liquid phase, nitroxylenes into xylidines and to provide for this process a catalyst of high activity at relatively low conversion temperatures, which catalyst at the same time possesses good mechanical strength enabling it to withstand without physical disintegration, continued contact with liquids in the reaction zone.

Other and further objects of my invention will appear from the following more detailed description and claims.

In the application of Edwin J. Gohr et al., Serial No. 499,768, filed August 24, 1943 (now U. S. Patent No. 2,415,817, issued February 18, 1947), there were disclosed a suitable apparatus and operating conditions for hydrogenating nitroxylenes on a commercial scale. This apparatus or any other suitable apparatus may be used in carrying my improvements into practical effect and since the gist of my invention goes to the use of certain catalysts and operating conditions rather than to apparatus, for simplicity, I have omitted as unnecessary a drawing.

I have set forth below several illustrative examples containing a full description of preferred modifications of my invention. It is to be understood that the precise details enumerated therein are merely illustrative and do not impose any limitation on my invention.

*Example 1*

In preparing molybdenum sulfide supported on alumina and clay, I proceeded as follows:

80 pounds of "aluminum trihydrate"

($Al_2O_3 \cdot 3H_2O$)

were mixed with two liters of acetic acid and 8 liters of a solution of molybdenum trioxide containing 10% (by weight) ammonia in the cold. This solution contained sufficient molybdenum trioxide to give the finished catalyst a content of about 8 to 10% $MoO_3$. The mixing operation was continued for 30 minutes. Thereafter 20 pounds of ball clay were added and the mixing continued for another thirty minutes. The mixed material was then extruded in the form of pellets of  diameter and broken up into pieces of about the same length. The pellets were dried at a temperature of about 250–300° F. and then activated for a period of about two hours at a temperature of 1200° F. This material was then charged to a tubular oven heated to a temperature of about 875° F. and hydrogen sulfide passed over the catalyst for a sufficient period of time (about 6 hours) to convert the molybdenum trioxide to molybdenum sulfide. The pressure during the sulfiding treatment was atmospheric.

In order to test the activity of the catalyst at a relatively low temperature, I proceeded as follows:

The catalyst was charged to an autoclave reactor and thereafter a mixture of four parts by volume of cyclohexane, a diluent, and one part by volume of nitroxylene was introduced into the reactor. The catalyst comprised about 33% of the total weight of the diluent and nitroxylene. The autoclave was closed and hydrogen was added until the pressure was of the order of about 1500 lbs./sq. in. At this point the reactor was heated to a temperature of 450° F. The hydrogen pressure was then adjusted to about 2700 lbs./sq. in. The bomb was maintained under these temperature and pressure conditions for a period of one hour, hydrogen being added periodically to maintain the pressure stated. The bomb was cooled to room temperature, its contents discharged, and the analysis of the product showed that 99.5% of the nitroxylenes charged to the reactor was converted.

The catalyst described above, before sulfiding in the tubular oven, i. e., in its oxide form, was charged to a high pressure unit adapted for continuous operation. The catalyst was first treated with a solution of carbon disulfide in gas oil for an extended period of time to convert the oxides into the sulfides. The feed rate of oil containing carbon disulfide (1% by weight) was 1 volume of the oil per volume of catalyst per hour, an average temperature of 435° F. was maintained during the treatment, and 12,000 cu. ft. of hydrogen measured at standard conditions were charged to the reactor for each barrel of oil. The pressure during the sulfiding was about 2700 lbs./sq. in. gauge. This reaction was completed in about 48 hours.

The reactor now containing sulfides of molybdenum on the support was charged with nitroxylene, a diluent comprising water, and hydrogen. The nitroxylene was mixed with water in the ratio of one volume of nitroxylene to four volumes of water. Carbon disulfide amounting to about one-half per cent by weight of the combined feed was used. In addition the water and nitroxylene were saturated with hydrogen sulfide before charging to the unit. A continuous feed rate of nitroxylene and water of two volumes of this mixture per volume of catalyst per hour to the reaction zone was maintained. The amount of hydrogen fed to the reaction zone was 12,000 cu. ft. per barrel on the total feed of nitroxylene and water. A pressure of 2700 pounds/sq. in. gauge was maintained in the reactor. During the course of a 10-day continuous run, the maximum temperature was 446° F. and the average temperature was about 380° F. Conversion of the nitroxylene was virtually complete during the whole operation.

*Example 2*

In this modification of my invention I prepared a catalyst consisting of a mixture of molybdenum sulfide and tungsten sulfide supported on alumina. In preparing this catalyst I proceeded as described in Example 1 to impregnate molybdenum oxide on "aluminum hydrate" and mix with clay in the proportion stated. After the impregnated material had been formed and heated at 1200° F. for two hours, 556 grams of the extruded pellets were further impregnated in the cold with a solution comprising 63.5 grams of tungstic acid dissolved in 300 cc. of 14% aqueous ammonia. This reimpregnated material was dried at a temperature of 250% F. It was then treated with hydrogen sulfide at about 875° F. and atmospheric pressure until all the oxides were converted to sulfides.

The sulfided material was charged to an autoclave. A feed consisting of 80% by volume cyclohexane and 20% nitroxylene was added. The catalyst amounted to 33% by weight of the combined feed. Hydrogen was added to the autoclave to produce a pressure of approximately 1500 lbs./sq. in. The autoclave was heated and the temperature raised to 375° F. The pressure was then adjusted to about 2700 lbs./sq. in. The autoclave was held at these conditions of temperature and pressure with hydrogen added periodically as necessary to maintain the last-named pressure. At the end of a half hour the bomb was cooled and the product discharged therefrom. Analysis of the product showed that 100% of the nitroxylene charged had been converted. In this process the nitroxylene was in liquid phase.

*Example 3*

In this modification of my invention I shall describe the preparation and use of a catalyst consisting of a mixture of molybdenum and nickel sulfides supported on alumina.

In the preparation of this catalyst I proceeded as described in Example 1 to impregnate molybdenum oxide on "aluminum hydrate" and to mix with clay in the stated proportion. After the impregnated material had been formed and heated at 1200° F., 862 grams of the extruded pellets were impregnated with 346 cc. of a cold nickel nitrate solution containing 39% by weight of nickel nitrate. The impregnated material was dried at a temperature of 250° F. and then heated for 2 hours at a temperature of 800° to 900° F. to decompose the nitrates to the oxides.

The metallic oxide comprising the active catalyst, i. e., the molybdenum oxide and the nickel oxide were converted to the sulfides in the same manner as described fully in Example 2 and thereafter the sulfided catalyst was tested in a run using the same feed stock, diluent, and operating conditions as in Example 2, except for the fact that in this run the temperature was maintained at 410° F., with the following results. Analysis of the product by standard procedure showed that more than 99.5% of the nitroxylenes was converted in the reaction. Inspection of the catalyst showed that it was only in fair physical condition having undergone some physical disintegration of the pellets by contact with the liquid in the bomb.

*Example 4*

In another modification of my invention, I prepared a molybdenum sulfide-nickel sulfide catalyst supported on alumina and subjected the catalyst to an additional heat treatment. In other words, I impregnated "aluminum trihydrate" with ammonium molybdate, added ball clay, dried the mixture and extruded and activated the material by a two-hour heat treatment at 1200° F. according to the procedure of Example 1. I then further heated the catalyst at 1450° F. for 8 hours and cooled to room temperature. I then incorporated nickel oxide by impregnating the heat treated catalyst with nickel nitrate, drying and decomposing the nickel salt and sulfiding the metals as described in Example 3. This catalyst was used in a run made on the same feed stock and under exactly the same conditions as were used in Example 3. On removal of the pellets from the autoclave they were found to be in good condition physically, with little indication of any physical disintegration. Furthermore, substantially 100% conversion was obtained in the reaction, showing that the prolonged heat treatment was not detrimental to the activity of the catalyst.

The results of Examples 3 and 4 show that the mechanical strength of the catalyst can be improved by subjecting it after the usual drying and activation to a prolonged heat treatment at elevated temperatures.

It will be apparent to those who are familiar with this art that numerous modifications of my invention may be practiced without departing from the spirit thereof. For example, instead of using "aluminum trihydrate," a product manufactured and sold by the Natural Products Refining Company, as the support or extending agent, I may use alumina gel, activated alumina or other forms of alumina. Magnesia may be used as an alumina substitute. With respect to the amount of clay which may be mixed with the alumina, from 10 to 40 weight per cent gives good results. With respect to the final heat treatment of the catalyst for the purpose of improving its mechanical strength, temperatures of from 1300° to 1500° F. and heating periods of from 2 to 6 to 12 hours give good results. Another expedient that may be employed to improve the quality of the catalyst is to treat the base material with acetic acid prior to impregnation.

From the foregoing it is apparent that my invention relates to methods of reducing nitro aromatics continuously according to special technique characterized by the following principal features:

1. The use of catalysts enabling carrying out the reaction at lower temperature levels, viz., below 500° F. I deem this important because the highly exothermic nature of the reaction is more readily controlled at the lower temperatures and there is also less opportunity for degradation of the feed and products.

2. The strengthening of the catalyst by heat treatment so that it can withstand without physical disintegration, in any substantial degree, continued contact with liquid reactants and/or water.

3. The use of catalysts comprising sulfides or mixed sulfides of sixth group metals and Fe group sulfides.

4. Finally, my catalysts provide improved means for continuous operation, thus making it possible to produce these valuable aviation gasoline additives in the huge quantities present day requirements demand.

I claim:

1. A process for preparing a catalyst of improved mechanical strength adapted to promote the hydrogenation of nitro aromatics in the liquid phase which comprises forming a mixture of at least one group 6 metal oxygen-containing compound and a support consisting of alumina and 10% to 40% clay, activating said mixture by heat treatment for a period of 2 hours at a temperature of about 1200° F., subjecting the mixture to a sulfiding treatment whereby the group 6 metal oxygen-containing compounds are converted to the sulfides, and heat treating the sulfided mixture at a temperature of 1300° F. to 1500° F. for a period of 2 to 12 hours to impart mechanical strength thereto.

2. A process for preparing a catalyst of improved mechanical strength adapted to promote the hydrogenation of nitro aromatics in the liquid phase which comprises forming a mixture of at least one group 6 metal oxygen-containing compound and a support consisting of alumina and 10% to 40% clay, activating said mixture by heat treatment for a period of 2 hours at a temperature of about 1200° F., impregnating the mixture with a solution of an oxygen-containing compound of a group 8 metal, drying the impregnated mixture, subjecting the mixture to a sulfiding treatment whereby the group 6 metal oxygen-containing compounds and the group 8 metal oxygen-containing compounds are converted to the sulfides, and heat treating the sulfided mixture at a temperature of 1300° F. to 1500° F. for a period of 2 to 12 hours to impart mechanical strength thereto.

ALEXIS VOORHIES, JR.

REFERENCES CITED

The following references are of record in the file of this patent:

UNITED STATES PATENTS

| Number | Name | Date |
|--------|------|------|
| 1,908,286 | Dorrer | May 9, 1933 |
| 2,370,707 | Archibald | Mar. 6, 1945 |
| 2,402,440 | Owen | June 18, 1946 |